United States Patent
Yamazaki

(10) Patent No.: US 11,440,264 B2
(45) Date of Patent: Sep. 13, 2022

(54) THREE-DIMENSIONAL SHAPED ARTICLE MANUFACTURING METHOD AND DATA PROCESSING DEVICE

(71) Applicant: SEIKO EPSON CORPORATION, Tokyo (JP)

(72) Inventor: Shigeru Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 65 days.

(21) Appl. No.: 17/073,452

(22) Filed: Oct. 19, 2020

(65) Prior Publication Data

US 2021/0114307 A1    Apr. 22, 2021

(30) Foreign Application Priority Data

Oct. 21, 2019   (JP) .............................. JP2019-191663

(51) Int. Cl.
  *B33Y 50/02*    (2015.01)
  *B29C 64/393*   (2017.01)
  *B33Y 10/00*    (2015.01)

(52) U.S. Cl.
  CPC ............ *B29C 64/393* (2017.08); *B33Y 10/00* (2014.12); *B33Y 50/02* (2014.12)

(58) Field of Classification Search
  CPC .................................................... B33Y 50/02
  USPC ............................................................. 700/98
  See application file for complete search history.

(56) References Cited

U.S. PATENT DOCUMENTS

2018/0140815 A1*  5/2018  Ono ...................... B05B 12/122
2018/0169757 A1   6/2018  Murao
2019/0092978 A1   3/2019  Ogino et al.
2019/0283320 A1*  9/2019  Mizukami ............. B29C 64/106
2020/0061914 A1*  2/2020  Onishi .................. B29C 64/209
2020/0070413 A1*  3/2020  Hiji ........................ B29C 64/386
2020/0139633 A1*  5/2020  Hiji .......................... B22F 10/20

FOREIGN PATENT DOCUMENTS

| JP | 2010-100883 A | 5/2010 | |
| JP | 2015-221516 A | 12/2015 | |
| JP | 2018-095946 A | 6/2018 | |
| JP | 2018-183930 A | 11/2018 | |
| JP | 2020104439 A | * 7/2020 | ........... B29C 64/118 |
| WO | 2017/159349 A1 | 1/2019 | |

* cited by examiner

*Primary Examiner* — Suresh Suryawanshi

(74) *Attorney, Agent, or Firm* — Global IP Counselors, LLP

(57) ABSTRACT

A three-dimensional shaped article manufacturing method includes: a first shaping step of forming a first layer in contact with a stage provided with a recess portion by moving a discharge unit while discharging a first shaping material; and a second shaping step of stacking a second layer on the first layer by moving the discharge unit while discharging a second shaping material from the discharge unit toward the first layer, in which the first shaping step includes acquiring first data including a first route; acquiring stage data indicating a position of the recess portion; a first data changing step of generating first changed data based on the first data such that an overlap degree between the first changed route and the recess portion is larger than an overlap degree between the first route and the recess portion, and forming the first layer according to the first changed data.

8 Claims, 10 Drawing Sheets

THREE-DIMENSIONAL SHAPED ARTICLE MANUFACTURING METHOD AND DATA PROCESSING DEVICE

The present application is based on, and claims priority from JP Application Serial Number 2019-191663, filed Oct. 21, 2019, the disclosure of which is hereby incorporated by reference herein in its entirety.

BACKGROUND

1. Technical Field

The present disclosure relates to a three-dimensional shaped article manufacturing method and a data processing device.

2. Related Art

Regarding a three-dimensional shaping device, for example, JP-A-2018-183930 discloses a technique for preventing warpage of a shaped article by shaping a three-dimensional shaped article by stacking a molten material on a stage having a plurality of pores.

When a layer is to be stacked on the stage having the pores, a part of the molten material stacked on the stage enters the pores and is cured to obtain an anchor effect, and adhesion between the stage and the shaped article is improved to prevent the warpage of the shaped article. However, when a route for stacking the molten material does not pass over the pores, an effective anchor effect cannot be obtained, and the adhesion between the stage and the shaped article may not be improved.

SUMMARY

According to one aspect of the present disclosure, a three-dimensional shaped article manufacturing method is provided. The three-dimensional shaped article manufacturing method includes: a first shaping step of forming a first layer in contact with a stage provided with a recess portion by moving a discharge unit while discharging a first shaping material from the discharge unit toward the stage; and a second shaping step of stacking a second layer on the first layer by moving the discharge unit while discharging a second shaping material from the discharge unit toward the first layer, in which the first shaping step includes acquiring first data including a first route that is a route on which the discharge unit moves while discharging the first shaping material, acquiring stage data indicating positions of the recess portion in the stage, a first data changing step of generating, based on the first data and the stage data, first changed data including a first changed route obtained by changing the first route, that is, generating the first changed data based on the first data such that an overlap degree between the first changed route and the recess portion is larger than an overlap degree between the first route and the recess portion, and forming the first layer according to the first changed data.

DESCRIPTION OF EXEMPLARY EMBODIMENTS

A. First Embodiment

Figure 1:
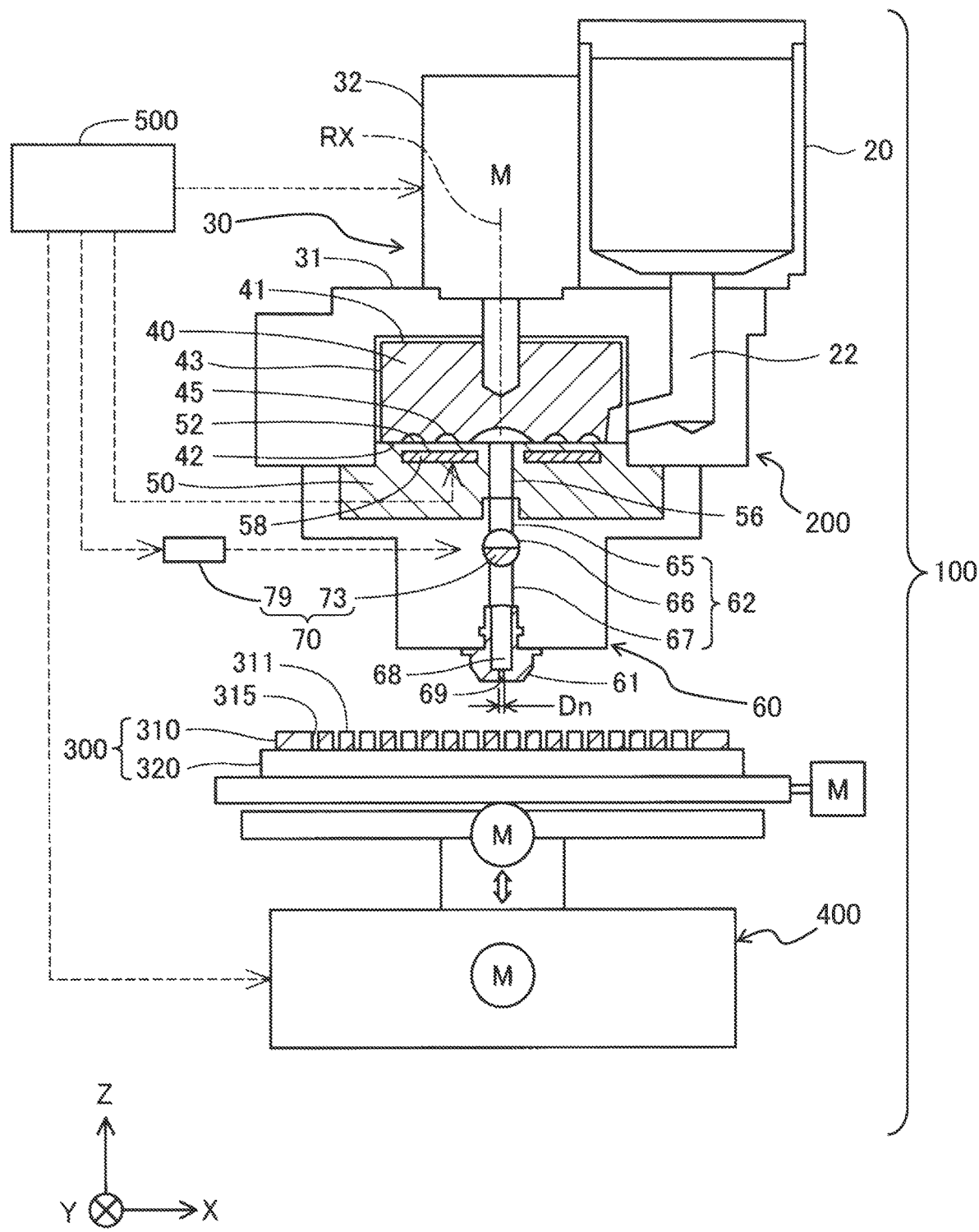
FIG. 1 is an explanatory diagram showing a schematic configuration of a three-dimensional shaping device according to a first embodiment.

FIG. 1 is an explanatory diagram showing a schematic configuration of a three-dimensional shaping device 100 according to a first embodiment. In FIG. 1, arrows along X, Y and Z directions orthogonal to each other are shown. The X direction and the Y direction are directions along a horizontal direction, and the Z direction is a direction along a vertical direction. In other figures, arrows along the X, Y and Z directions are also shown appropriately. The X, Y and Z directions in FIG. 1 and the X, Y and Z directions in other figures indicate the same directions, respectively.

The three-dimensional shaping device 100 according to the present embodiment includes a shaping unit 200, a stage 300, a moving mechanism 400, and a control unit 500. The three-dimensional shaping device 100 shapes a three-dimensional shaped article having a desired shape on a shaping surface 311 by, under control of the control unit 500, discharging a shaping material from a discharge unit 60 provided on the shaping unit 200 towards the stage 300 while driving the moving mechanism 400 to change a relative position between the discharge unit 60 and the stage 300. The shaping material may be referred to as a molten material. A detailed configuration of the shaping unit 200 will be described later.

The stage 300 includes a plate portion 310 and a base portion 320 that supports the plate portion 310. The plate portion 310 has the shaping surface 311 facing the discharge unit 60. The shaping material discharged from the discharge unit 60 is stacked on the shaping surface 311. The stage 300 is provided with recess portions 315. Each recess portion 315 means a part in which the shaping surface 311 is recessed by providing a recess, a through hole, or a groove in the plate portion 310. In the present embodiment, a plurality of through holes having opening portions in the shaping surface 311 are provided in the plate portion 310, and the plurality of recess portions 315 in which the shaping surface 311 is recessed are formed in the stage 300 in a manner of combining the plate portion 310 and the base portion 320. A specific configuration of the stage 300 on a shaping surface 311 side will be described later.

The moving mechanism 400 changes a relative position between the discharge unit 60 and the shaping surface 311. In the present embodiment, the moving mechanism 400 changes the relative position between the discharge unit 60 and the shaping surface 311 by moving the stage 300 relative to the shaping unit 200. The change in the relative position of the discharge unit 60 relative to the shaping surface 311 may be referred to as a movement of the discharge unit 60. In the present embodiment, for example, moving the stage 300 in a +X direction can also be rephrased as moving the discharge unit 60 in a −X direction.

The moving mechanism 400 according to the present embodiment is implemented by a three-axis positioner that moves the stage 300 in three axial directions, which are the X, Y and Z directions, by driving force of three motors. Each motor is driven under the control of the control unit 500. The moving mechanism 400 may be configured to change the relative position between the discharge unit 60 and the shaping surface 311 by moving the shaping unit 200 without moving the stage 300 instead of moving the stage 300. The moving mechanism 400 may be configured to change the relative position between the discharge unit 60 and the shaping surface 311 by moving both the stage 300 and the shaping unit 200.

The control unit 500 is implemented by a computer including one or more processors, a main storage device, and an input/output interface for inputting and outputting signals from and to an outside. In the present embodiment, the control unit 500 controls operations of the shaping unit 200 and the moving mechanism 400 by the processor executing a program or an instruction read from the main storage device, thereby executing shaping processing for shaping the three-dimensional shaped article. The operations include changing a three-dimensional relative position between the shaping unit 200 and the stage 300. The control unit 500 may be implemented by a combination of a plurality of circuits instead of the computer. As will be described later, the control unit 500 also functions as a data processing device that processes data for shaping the three-dimensional shaped article. In other embodiments, a data processing device separate from the control unit 500 may be provided.

The shaping unit 200 includes a material supply unit 20 as a material supply source, a melting unit 30 for melting a material supplied from the material supply unit 20 into the shaping material, the discharge unit 60 having a nozzle hole 69 for discharging the shaping material supplied from the melting unit 30, and a discharge amount adjustment mechanism 70 for adjusting a flow rate of the shaping material discharged from the nozzle hole 69.

The material supply unit 20 accommodates a material in a state of pellets, powder, or the like. In the present embodiment, a resin formed in a pellet shape is used as the material. The material supply unit 20 according to the present embodiment is implemented by a hopper. A supply path 22 that couples the material supply unit 20 and the melting unit 30 is provided below the material supply unit 20. The material supply unit 20 supplies the material to the melting unit 30 via the supply path 22. Details of the material will be described later.

The melting unit 30 includes a screw case 31, a drive motor 32, a flat screw 40, and a barrel 50. The melting unit 30 melts at least a part of the material in a solid state supplied from the material supply unit 20 into a fluid paste-shaped shaping material and supplies the melted material to the discharge unit 60. The term "melt" means not only that a thermoplastic material is heated to a temperature equal to or higher than a melting point to be a liquid, but also means "plasticization", that is, a thermoplastic material is softened by being heated to a temperature equal to or higher than a glass transition point to exhibit fluidity.

The screw case 31 is a housing for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation axis of the drive motor 32 is coupled to an upper surface 41 side of the flat screw 40. The drive motor 32 is driven under the control of the control unit 500.

The flat screw 40 has a substantially cylindrical shape whose height in a direction along a central axis RX is smaller than a diameter thereof. The flat screw 40 is disposed in the screw case 31 in a manner that the central axis RX is parallel to the Z direction. The flat screw 40 rotates around the central axis RX in the screw case 31 due to a torque generated by the drive motor 32. The flat screw 40 has a groove forming surface 42 in which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 has a screw facing surface 52 that faces the groove forming surface 42 of the flat screw 40. A communication hole 56 that communicates with the discharge unit 60 is provided on the central axis RX of the flat screw 40 in the barrel 50. A heater 58 is built in the barrel 50 at a position facing the groove portions 45 of the flat screw 40. A temperature of the heater 58 is controlled by the control unit 500. A specific configuration of the barrel 50 on a screw facing surface 52 side will be described later.

The discharge unit 60 is fixed to a lower surface of the barrel 50. The discharge unit 60 includes a supply flow path 62 and a nozzle 61. The supply flow path 62 communicates with the melting unit 30 and the nozzle 61, and supplies the shaping material from the melting unit 30 to the nozzle 61.

The supply flow path 62 includes a first supply port 65, an intersection hole 66, and a second supply port 67. The first supply port 65 and the second supply port 67 extend in the vertical direction. The intersection hole 66 extends in the horizontal direction intersecting the first supply port 65 and the second supply port 67. An upper end of the first supply port 65 is coupled to the communication hole 56 of the barrel 50, and a lower end of the first supply port 65 is coupled to the intersection hole 66. An upper end of the second supply port 67 is coupled to the intersection hole 66, and a lower end of the second supply port 67 is coupled to the nozzle 61. A valve portion 73 of the discharge amount adjustment mechanism 70, which will be described later, is accommodated in the intersection hole 66. The shaping material supplied from the communication hole 56 of the barrel 50 to the first supply port 65 flows in an order of the intersection hole 66, the second supply port 67, and the nozzle 61.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a part provided at an end portion of the nozzle flow path 68 on a side communicating with the atmosphere and having a reduced flow path cross section. The shaping material supplied from the second supply port 67 to the nozzle flow path 68 is discharged from the nozzle hole 69. In the present embodiment, an opening shape of the nozzle hole 69 is circular. A diameter of the opening portion of the nozzle hole 69 is called a nozzle diameter Dn. The opening shape of the nozzle hole 69 is not limited to circular, and may be, for example, a quadrangle or a polygon other than the quadrangle.

The discharge amount adjustment mechanism 70 includes the valve portion 73 disposed in the intersection hole 66 and a valve drive unit 79 causing the valve portion 73 to rotate. The valve drive unit 79 is implemented by an actuator such as a stepping motor, and causes the valve portion 73 to rotate in the intersection hole 66 under the control of the control unit 500. The discharge amount adjustment mechanism 70 adjusts an amount of the shaping material discharged from the nozzle hole 69 by adjusting a flow rate of the shaping material flowing from the first supply port 65 into the second supply port 67 by causing the valve portion 73 to rotate. The shaping material discharged from the nozzle hole 69 per unit time may be referred to as a discharge amount. A specific configuration of the discharge amount adjustment mechanism 70 will be described later.

Figure 2:
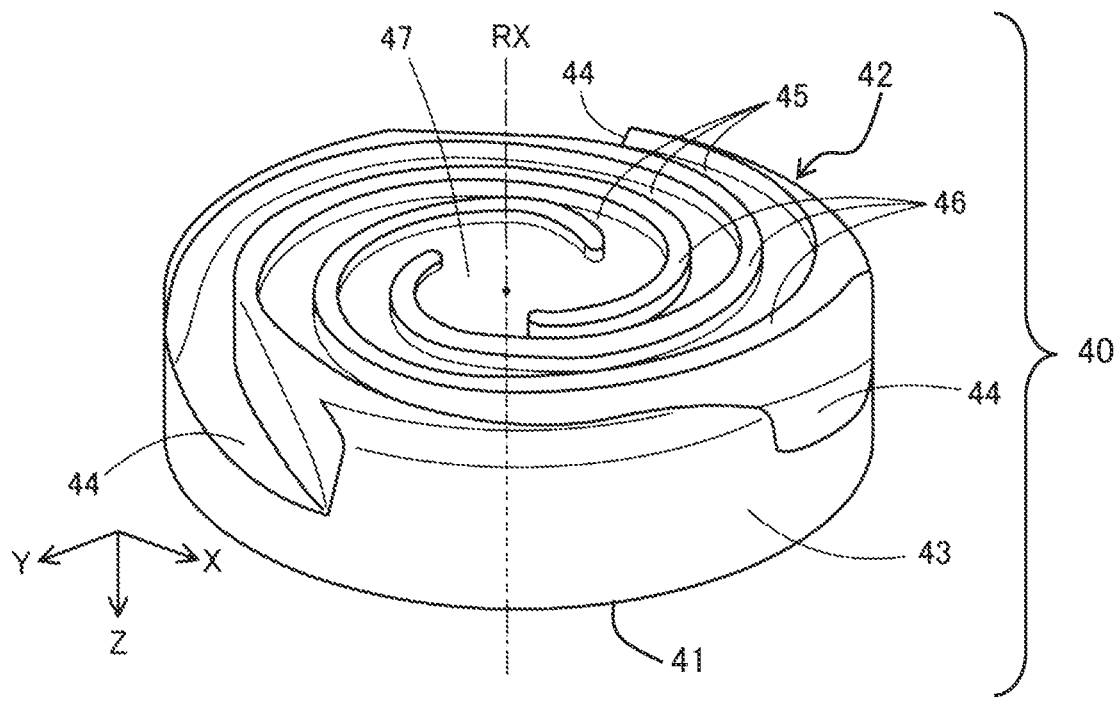
FIG. 2 is a schematic perspective view showing a configuration of a flat screw on a groove forming surface side.

FIG. 2 is a schematic perspective view showing a configuration of the flat screw 40 on the groove forming surface 42 side. In FIG. 2, the position of the central axis RX of the flat screw 40 is indicated by a one dot chain line. The groove portions 45 are provided in the groove forming surface 42 as described with reference to FIG. 1.

A central portion 47 of the groove forming surface 42 of the flat screw 40 is configured as a recess to which one end of each groove portion 45 is coupled. The central portion 47 faces the communication hole 56 of the barrel 50 shown in FIG. 1. The central portion 47 intersects the central axis RX.

The groove portion 45 of the flat screw 40 forms a so-called scroll groove. The groove portion 45 extends in a vortex shape from the central portion 47 in a manner of drawing an arc toward an outer periphery of the flat screw 40. The groove portion 45 may be configured to extend in a spiral shape. The groove forming surface 42 is provided with ridge portions 46 that constitute side wall portions of the groove portions 45 and extend along the groove portions 45.

The groove portion 45 is continuous to a material introduction port 44 formed in a side surface 43 of the flat screw 40. The material introduction port 44 is a part for receiving the material supplied via the supply path 22 of the material supply unit 20.

FIG. 2 shows an example of the flat screw 40 having three groove portions 45 and three ridge portions 46. The number of the groove portion 45 and the ridge portion 46 provided in the flat screw 40 is not limited to three. Only one groove portion 45 may be provided in the flat screw 40, or two or more groove portions 45 may be provided. Any number of the ridge portion 46 may be provided in accordance with the number of the groove portion 45.

FIG. 2 shows an example of the flat screw 40 in which the material introduction port 44 is formed at three locations. The number of the material introduction port 44 provided in the flat screw 40 is not limited to three. In the flat screw 40, the material introduction port 44 may be provided at only one location, or may be provided at two or more locations.

Figure 3:
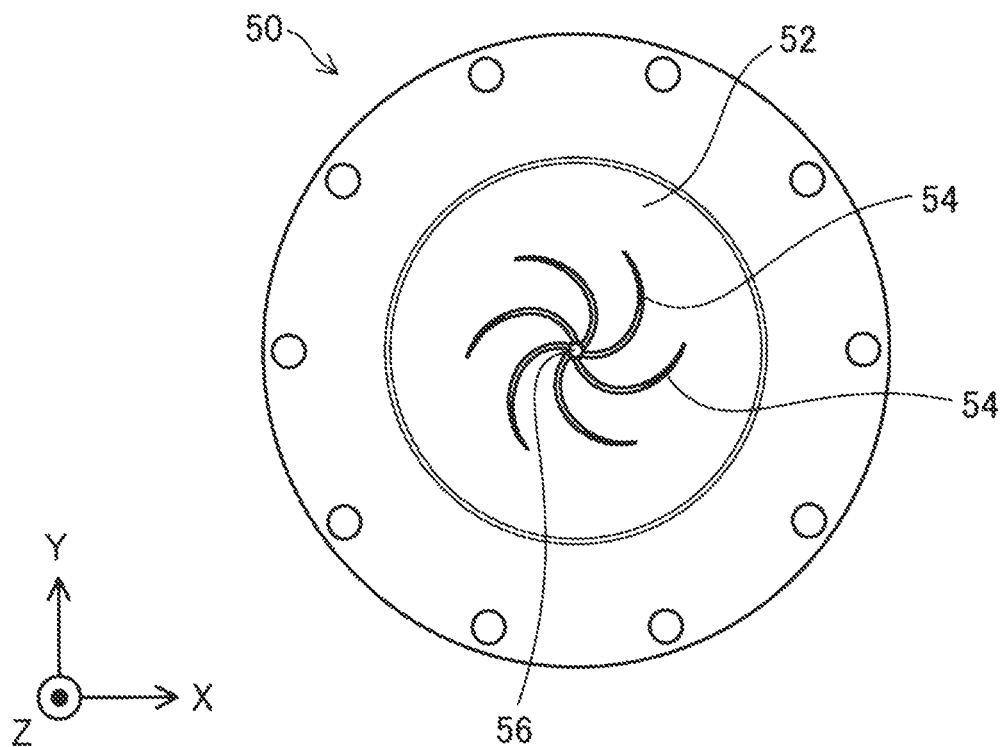
FIG. 3 is a top view showing a configuration of a barrel on a screw facing surface side.

FIG. 3 is a top view showing a configuration of the barrel 50 on the screw facing surface 52 side. As described above, the communication hole 56 communicating with the discharge unit 60 is formed at a center of the screw facing surface 52. A plurality of guide grooves 54 are formed around the communication hole 56 in the screw facing surface 52. Each guide groove 54 has one end coupled to the communication hole 56, and extends in a vortex shape from the communication hole 56 toward an outer periphery of the screw facing surface 52. The guide grooves 54 have a function of guiding the shaping material to the communication hole 56.

Figure 4:
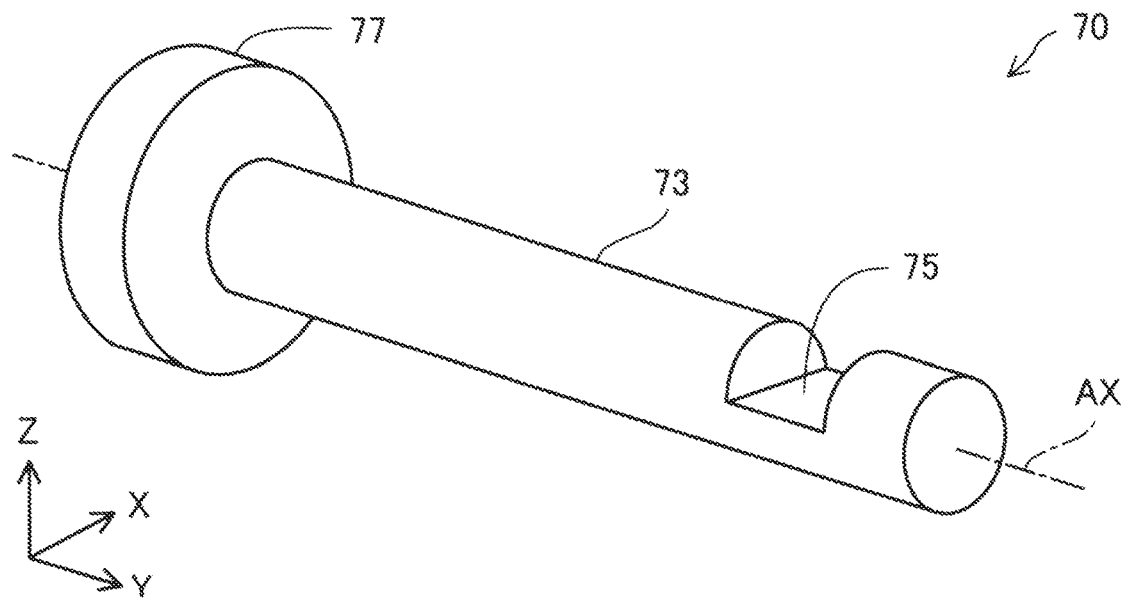
FIG. 4 is a perspective view showing a configuration of a valve portion of a discharge amount adjustment mechanism.

FIG. 4 is a perspective view showing a configuration of the valve portion 73 of the discharge amount adjustment mechanism 70. As described above, the discharge amount adjustment mechanism 70 includes the valve portion 73 disposed in the intersection hole 66. The valve portion 73 has a cylindrical shape centered on a central axis AX. The valve portion 73 is provided with a cutout portion 75 obtained by cutting out a part of the cylindrical outer periphery in a half moon shape. An operation portion 77 is provided at an end portion of the valve portion 73 on a −Y direction side. The valve drive unit 79 is coupled to the operation portion 77. The valve portion 73 rotates by applying a torque caused by the valve drive unit 79 to the operation portion 77. The cutout portion 75 may be referred to as a flow passage.

Figure 5:
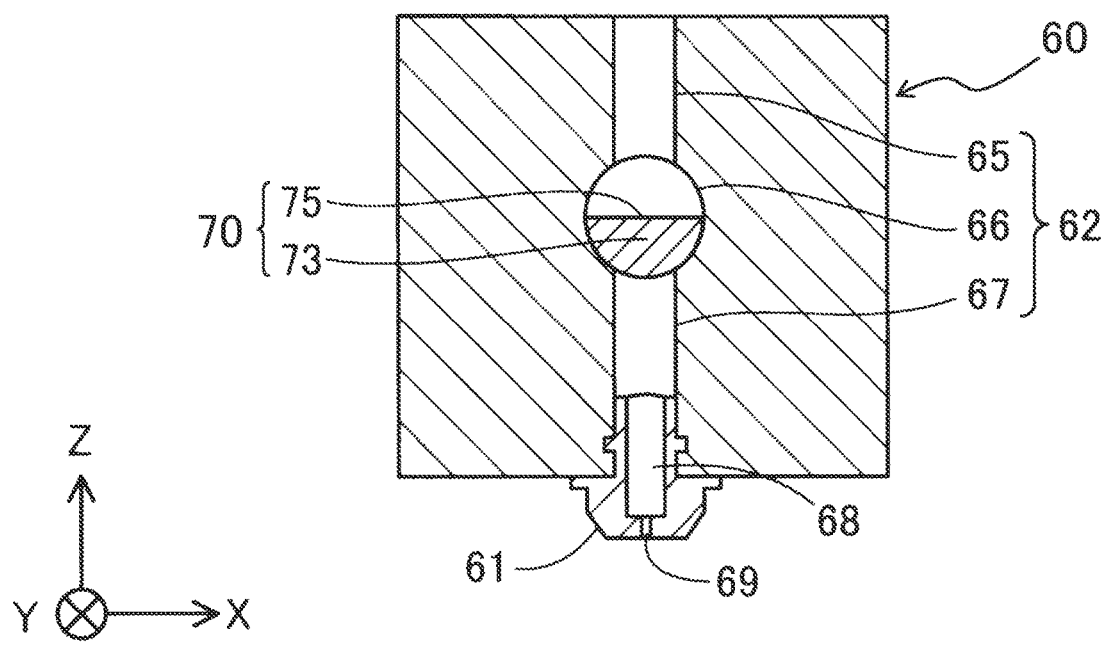
FIG. 5 is a first explanatory diagram showing an operation of the valve portion of the discharge amount adjustment mechanism.

FIG. 5 is a first explanatory diagram showing an operation of the valve portion 73 of the discharge amount adjustment mechanism 70. As shown in FIG. 5, when the valve portion 73 rotates such that the cutout portion 75 is positioned above, the second supply port 67 is closed by the valve portion 73, and inflow of the shaping material from the first supply port 65 to the second supply port 67 is blocked. On the other hand, when the valve portion 73 rotates such that the cutout portion 75 faces the +X direction or the −X direction, the first supply port 65 and the second supply port 67 communicate with each other, and the shaping material flows from the first supply port 65 into the second supply port 67 at a maximum flow rate. The discharge amount adjustment mechanism 70 changes a flow path cross-sectional area between the first supply port 65 and the second supply port 67 in accordance with the rotation of the valve portion 73, and changes the flow rate of the shaping material flowing from the first supply port 65 into the second supply port 67. The discharge amount adjustment mechanism 70 may be implemented by, for example, a gate valve, a globe valve, or a ball valve instead of the above-described valve portion 73.

Figure 6:
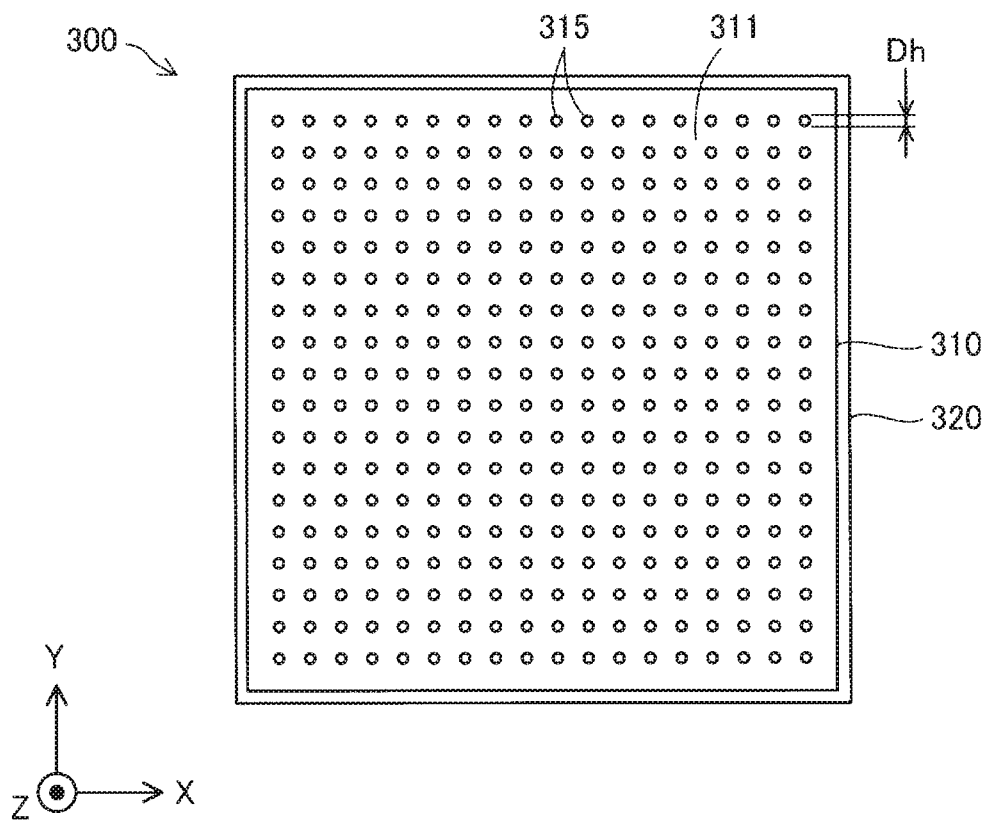
FIG. 6 is a top view showing a configuration of a stage on a shaping surface side.

FIG. 6 is a top view showing a configuration of the stage 300 on the shaping surface 311 side. In the present embodiment, the plate portion 310 is implemented by a quadrangle plate-shaped member. The plate portion 310 has the shaping surface 311 on which a shaping material is stacked on an upper surface thereof. The plate portion 310 is provided with the plurality of recess portions 315 each having an opening portion in the shaping surface 311. The opening portions of the plurality of recess portions 315 are arranged in a lattice shape on the shaping surface 311. In the shaping surface 311, the plurality of recess portions 315 are arranged at equal intervals along the X direction, and the plurality of recess portions 315 are arranged at equal intervals along the Y direction. The plate portion 310 may be implemented by a circular plate-shaped member instead of the quadrangle plate-shaped member.

Each recess portion 315 has a circular opening shape. Diameters Dh of the opening portions of the recess portions 315 are set to be the same. Each of the diameters Dh of the opening portions of the recess portions 315 is set to be larger than the nozzle diameter Dn. For example, epoxy glass can be used as a material of the plate portion 310. The recess portions 315 can be provided by performing a cutting process on the plate portion 310. The opening shape of the recess portions 315 may be a quadrangle or may be a polygon other than the quadrangle, instead of a circle. Each of the diameters Dh of the opening portions of the recess portions 315 may be set to be smaller than the nozzle diameter Dn.

Figure 7:
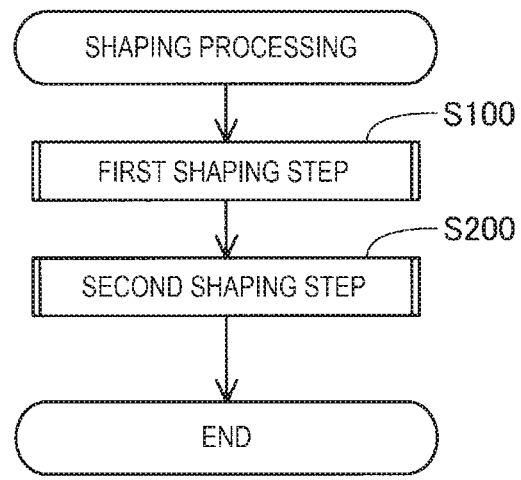
FIG. 7 is a process diagram showing a process of manufacturing a three-dimensional shaped article.
Figure 8:
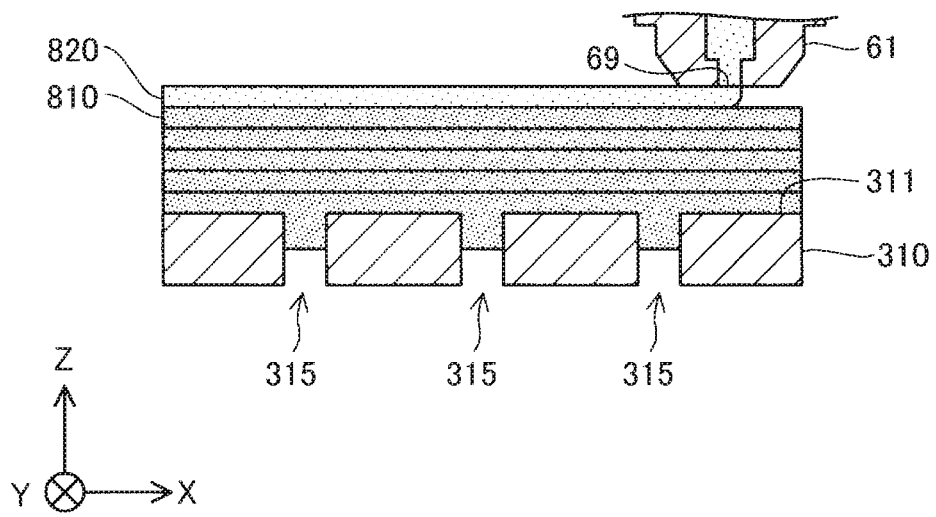
FIG. 8 is an explanatory diagram showing a state of shaping a three-dimensional shaped article according to the first embodiment.

FIG. 7 is a process diagram showing a process of manufacturing the three-dimensional shaped article according to the present embodiment. FIG. 8 is an explanatory diagram showing a state of shaping a three-dimensional shaped article according to the present embodiment. The control unit 500 executes the shaping processing when a predetermined start operation is performed by a user on an operation panel provided in the three-dimensional shaping device 100 or a computer coupled to the three-dimensional shaping device 100. Manufacturing of the three-dimensional shaped article by the three-dimensional shaping device 100 is started by executing the shaping processing.

In a first shaping step of step S100, the control unit 500 appropriately controls the melting unit 30, the discharging unit 60, and the moving mechanism 400 to move the discharging unit 60 while discharging the shaping material from the discharging unit 60 toward the stage 300, thereby forming a first layer 810 in contact with the stage 300.

In a second shaping step of step S200, the control unit 500 appropriately controls the melting unit 30, the discharging unit 60, and the moving mechanism 400 to move the discharging unit 60 while discharging the shaping material from the discharging unit 60 toward the first layer 810, thereby forming a second layer 820 on the first layer 810. FIG. 8 shows a state in which the second layer 820 is being formed on the first layer 810. In the present embodiment, the control unit 500 forms the three-dimensional shaped article by forming a base part that supports the shaped article by stacking a layer that has five layers as the first layer 810, and stacking the second layer 820 that includes a plurality of layers on the first layer 810. The first layer 810 or the second layer 820 may include one layer, or may include two or more layers as in the present embodiment. The base part that supports the shaped article is also referred to as a "raft". The raft is preferably shaped so as to secure adhesion between the stage 300 and the raft and to be easily peeled off from the shaped article after completion of the shaping. For example, the raft is shaped in a lattice shape or a rectangular shape when viewed from the Z direction.

In the present embodiment, different types of materials are used in the first shaping step and the second shaping step. Specifically, in the first shaping step, a first material charged to the material supply unit 20 is plasticized by the melting unit 30, and is discharged from the discharge unit 60 as a first shaping material. In the second shaping step, a second material charged to the material supply unit 20 is plasticized by the melting unit 30, and is discharged from the discharge unit 60 as a second shaping material. Therefore, for example, the first layer 810 as the raft can be formed using the first shaping material which is less expensive than the second shaping material. The first material and the second material can also be selected in consideration of easiness of peeling off the raft after the completion of the shaping. In the present embodiment, a pellet-shaped PVA resin is used as the first material, and a pellet-shaped ABS resin is used as the second material.

Figure 9:
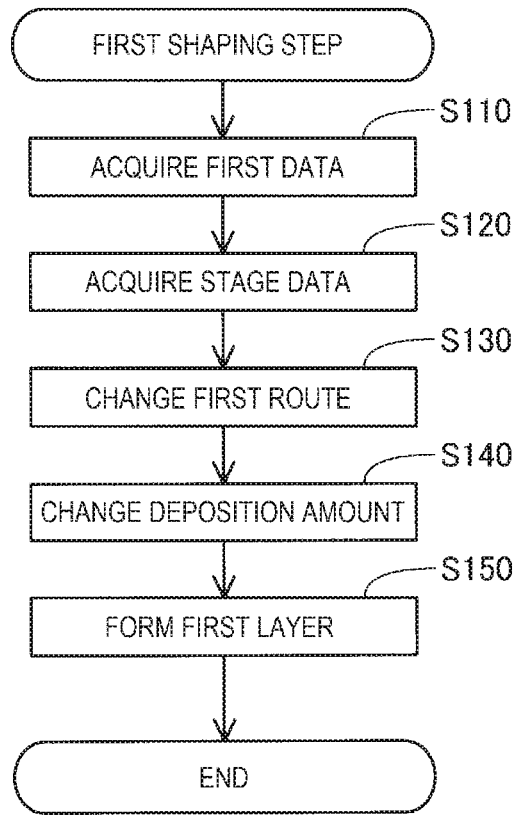
FIG. 9 is a process diagram showing contents of a first shaping step.

FIG. 9 is a process diagram showing contents of the first shaping step according to the present embodiment. First, in a first data acquisition step of step S110, the control unit 500 acquires first data. The first data is data including a first route that is a route on which the discharge unit 60 moves while discharging the first material in the first shaping step. In the present embodiment, the first data and second data to be described later may be referred to as shaping data. The second data is data including a second route that is a route on which the discharge unit 60 moves while discharging the second material in the second shaping step.

In the present embodiment, the shaping data includes deposition amount information of the shaping material discharged from the discharge unit 60. Specifically, the first data includes first deposition amount information, and the second data includes second deposition amount information. The "deposition amount" refers to an amount of the shaping material discharged per unit movement amount of the discharge unit 60, and changes depending on a moving speed of the discharge unit 60 and a discharge amount of the shaping material discharged from the discharge unit 60. For example, the deposition amount in a certain section increases when the moving speed of the discharge unit 60 is decreased in the section. The deposition amount in a certain section increases when the discharge amount is increased in the section. When the first layer 810 and the second layer 820 are formed, a set deposition amount of the shaping material is stacked by adjusting a scanning speed and the discharge amount of the discharge unit 60 by the control unit 500.

The shaping data is generated by, for example, slicer software installed in a computer coupled to the three-dimensional shaping device 100. The slicer software generates the shaping data by reading shape data representing a shape of the three-dimensional shaped article created by using three-dimensional CAD software or three-dimensional CG software, and dividing the shape of the three-dimensional shaped article into layers each having a predetermined thickness. Data in an STL format, AMF format or the like is used as the shape data to be read into the slicer software. Shaping data created by slicer software is represented by a G code, an M code, or the like. The control unit 500 acquires the shaping data from a computer coupled to the three-dimensional shaping device 100 or a recording medium such as a USB memory.

In step S120, the control unit 500 acquires stage data. The stage data is data indicating positions of the recess portions 315 provided in the stage 300. In the present embodiment, the control unit 500 acquires stage data in which information on the positions of the recess portions 315 and a diameter of each recess portion 315 are preset. In the present embodiment, the information on the diameter of each recess portion 315 is the diameter of the opening portion of each recess portion 315 on the stage 300. In another embodiment, the information on the diameter of each recess portion 315 may be an opening area of each recess portion 315. A detection unit that detects the position and the diameter of the recess portion 315 may be provided in the three-dimensional shaping device 100, and the stage data may be created based on the detection result detected by the detection unit.

In a first route changing step of step S130, the control unit 500 generates a first changed route by changing the first route included in the first data. Specifically, the control unit 500 generates the first changed route by analyzing the first data and the stage data, and changing the first route such that an overlap degree in the first changed route is larger than an overlap degree in the first route. In the present embodiment, "change a route" refers to moving the entire route along the X direction and the Y direction by a constant distance. In another embodiment, for example, the route may be changed by rotating the entire route, or the route may be changed by deforming the route. Details of the overlap degree will be described later.

Figure 10:
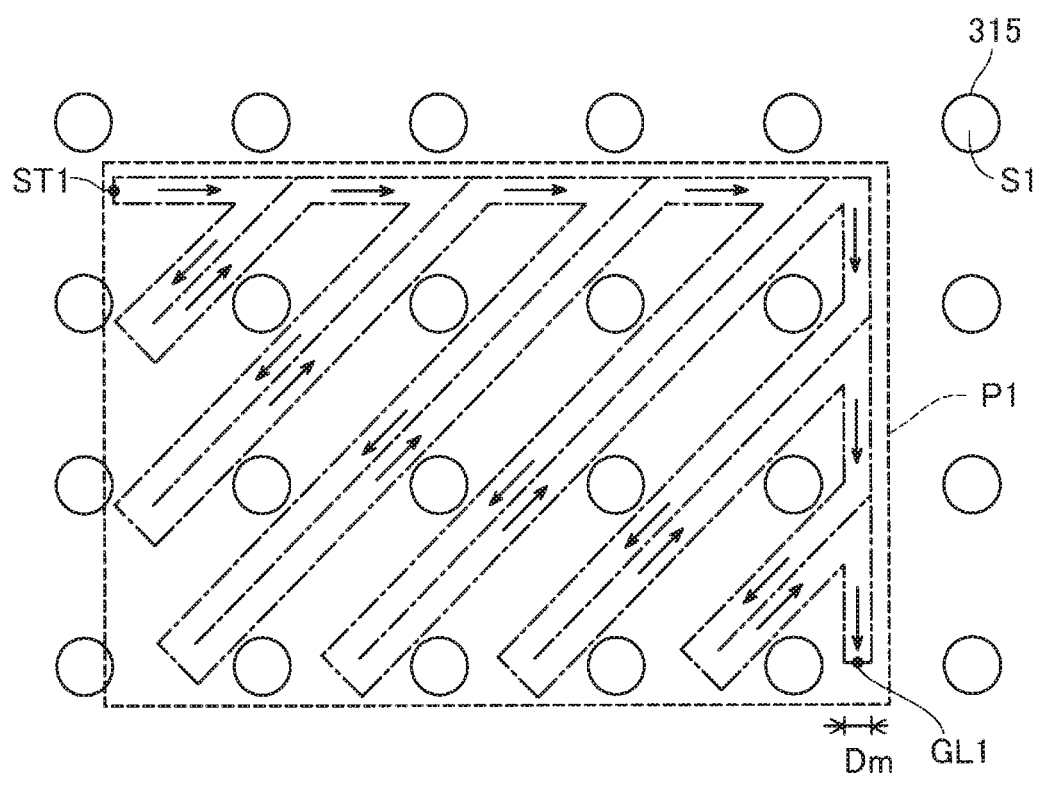
FIG. 10 is an explanatory diagram showing a trajectory of a first shaping material discharged according to first data according to the first embodiment.

FIG. 10 is an explanatory diagram showing a trajectory of the first shaping material discharged according to the first data in the present embodiment. In the present embodiment, the first route included in the first data is a route for shaping so as to satisfy a predetermined filling rate in a region P1 surrounded by a predetermined outline. The filling rate is a proportion of an area of the trajectory of the first shaping material discharged according to the first route relative to an area of the region P1. The outline is determined as, for example, an outer edge of the shaped article, which is a part of the shaped article that can be visually recognized from an outside. A region defined by coupling an outside part of the route may be set as the outline without defining the outline in advance.

Figure 11:
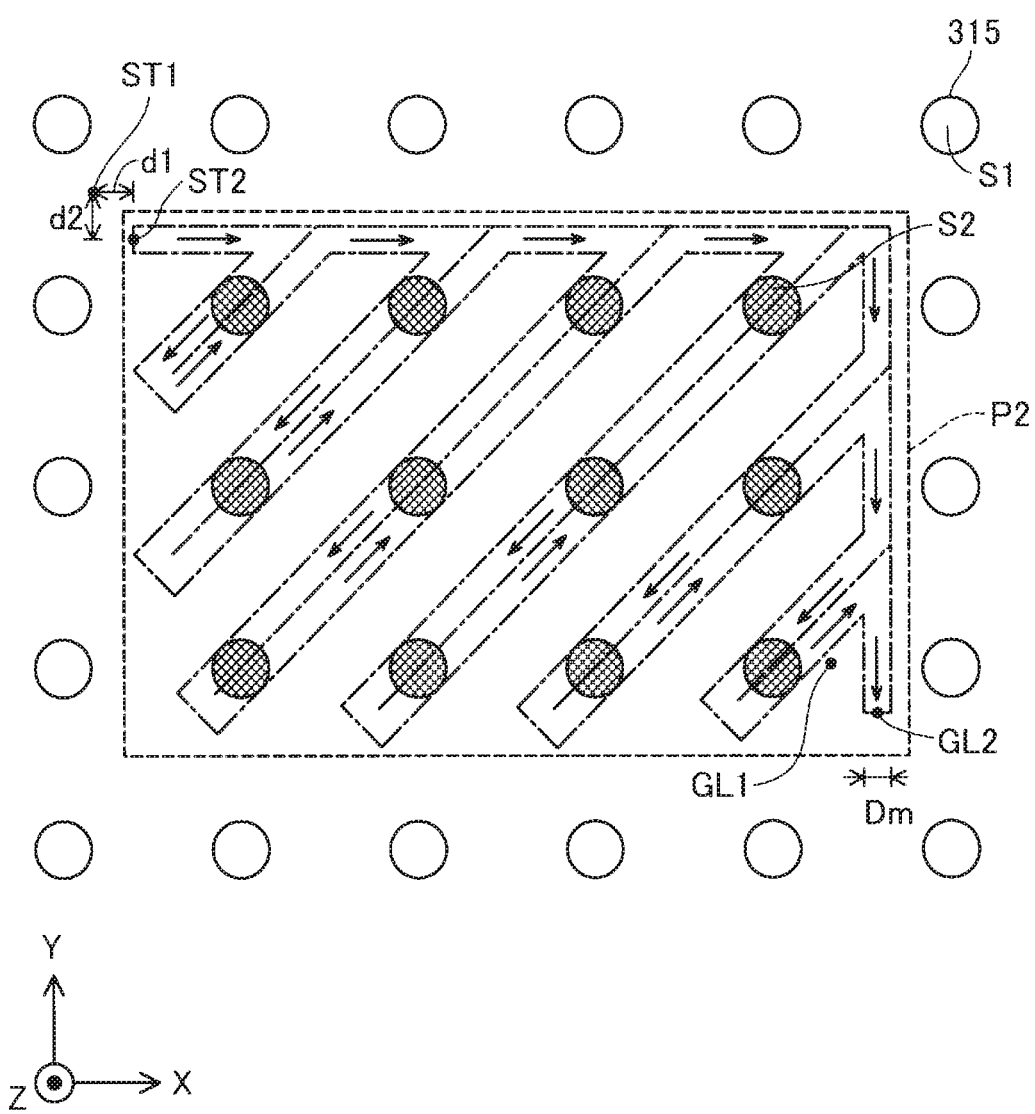
FIG. 11 is an explanatory diagram showing a trajectory of the first shaping material discharged according to second data according to the first embodiment.

FIG. 11 is an explanatory diagram showing a trajectory of the first shaping material discharged according to the second data in the present embodiment. The first route changing step of step S130 will be described with reference to FIGS. 10 and 11.

FIG. 10 shows the trajectory of the first shaping material discharged from the nozzle hole 69 while the nozzle 61 moves from a start point ST1 to an end point GL1 of the first route according to the first data. In FIG. 10, the trajectory of the first shaping material discharged from the nozzle hole 69 is indicated by broken lines and arrows. P1 surrounded by the outline is indicated by broken lines. In the present embodiment, in the first shaping step, shaping is performed with a constant line width Dm. The line width is a length of the first shaping material discharged from the nozzle hole 69 in a direction intersecting a scanning direction. The line width is determined based on, for example, the deposition amount and a height of the shaping material discharged onto the shaping surface 311. In another embodiment, the line width may not be constant during the first shaping step.

In the present embodiment, the above-described "overlap degree" is calculated as a value represented by a percentage, which is a proportion of an area of an overlapped part relative to the opening area of the recess portions 315 present in the region surrounded by the outline. The overlapped part is a part where the shaping material discharged from the nozzle 61 overlaps the recess portions 315 when viewed from the Z direction intersecting the stage 300. In the present embodiment, each recess portion 315 has an opening area S1. In FIG. 10, the overlap degree in the first route is 0% since no overlapped part is present in the recess portions 315 in the region P1. The area of the overlapped part can be obtained based on, for example, a value related to the line width of the shaping material discharged from the nozzle 61 and the diameter of each recess portion 315.

FIG. 11 shows a trajectory of the first shaping material discharged from the nozzle hole 69 while the nozzle 61 moves from a start point ST2 to an end point GL2 of the second route according to the first changed data. In FIG. 11, the trajectory of the first shaping material discharged from the nozzle hole 69 is indicated by broken lines and arrows. P2 surrounded by the outline is indicated by broken lines. The first changed route shown in FIG. 11 is a route obtained by moving the entire first route shown in FIG. 10 by d1 in the +X direction and d2 in the +Y direction. That is, the start point ST2 is positioned d1 away in the +X direction and d2 away in the +Y direction from the start point ST1. Similarly, the end point GL2 is positioned d1 away in the +X direction and d2 away in the +Y direction from the end point GL1. In each recess portion 315 in the region P2 surrounded by the outline, an area S2 of the overlapped part is equal to the opening area S1 of each recess portion 315. At the time, the overlap degree in the first changed route is 100%, and is larger than the overlap degree in the first route in FIG. 10.

For example, in step S130, the control unit 500 can increase the overlap degree by changing the first route whose start point is ST1 and end point is GL1 to the first changed route whose start point is ST2 and end point is GL2. By increasing the overlap degree, when a lowermost layer of the first layer 810 is formed, the first shaping material that flows into the recess portions 315 and is cured is increased, and adhesion between the first layer 810 and the stage 300 is improved. Improving the adhesion between the shaped article and the stage 300 by flowing a part of the shaping material into the recess portions 315 provided in the stage 300 and performing curing is also referred to as an anchor effect.

In a deposition amount changing step of step S140, the control unit 500 generates changed deposition amount information by changing the first deposition amount information included in the first data. Specifically, the deposition amount in the part where the first changed route overlaps the recess portions 315 is larger than the deposition amount in a part where the first changed route does not overlap the recess portions 315.

Figure 12:
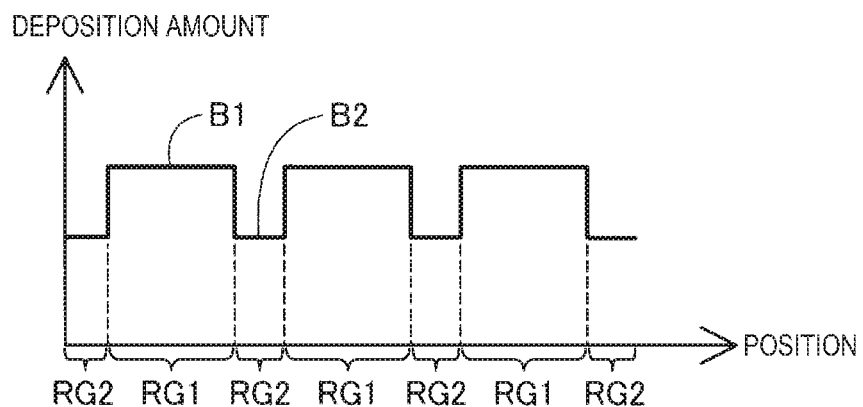
FIG. 12 is a graph showing a relationship between a position on the stage and a deposition amount of the first shaping material.

FIG. 12 is a graph schematically showing a relationship between a position on the stage 300 and a deposition amount of the first shaping material according to the present embodiment. A horizontal axis represents the position on the stage 300. A vertical axis represents the deposition amount of the shaping material supplied onto the stage 300. In the present embodiment, the shaping material is supplied by a second deposition amount B2 in a part RG2 where the recess portions 315 do not overlap the second route, and the shaping material is supplied by a first deposition amount B1 which is larger than the second deposition amount B2 in a part RG1 where the recess portions 315 overlap the second route.

The above steps S130 and S140 are also referred to as a first data changing step. The data generated in the first data changing step is referred to as the first changed data. In the present embodiment, the first changed data is data including the first changed route and the changed deposition amount information. That is, in the present embodiment, the first changed data is generated by changing the first route in the first data, and further, changing the first deposition amount information.

In step S150, the control unit 500 forms the first layer 810 according to the first changed data.

Figure 13:
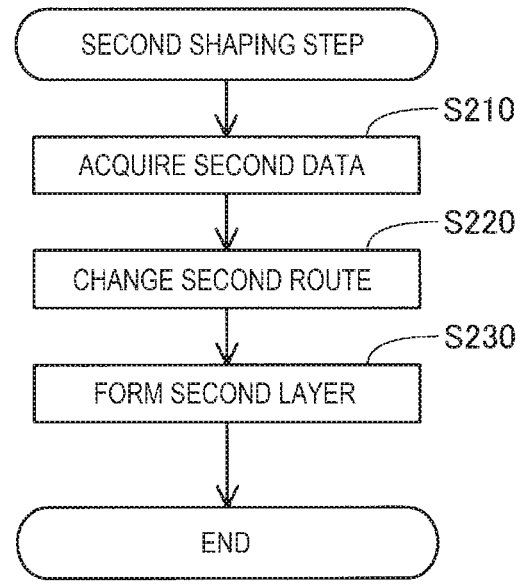
FIG. 13 is a process diagram showing contents of a second shaping step.

FIG. 13 is a process diagram showing contents of the second shaping step according to the present embodiment. First, in a second data acquisition step of step S210, the control unit 500 acquires a second data including the second route and the second deposition amount information.

In a second route changing step of step S220, the control unit 500 generates a second changed route by changing the second route included in the second data. At the time, the control unit 500 generates the second changed route by changing the second route based on the change of the route from the first route to the first changed route in the first route changing step. In the present embodiment, the second route is changed based on movement amounts of the first route in the first route changing step in the X direction and the Y direction. Specifically, the second changed route is generated by moving the entire second route by d1 in the +X direction and d2 in the +Y direction.

Step S220 is also referred to as a second data changing step. The data generated in the second data changing step is referred to as second changed data. In the present embodiment, the second changed data is data including the second changed route and the second deposition amount information. That is, in the present embodiment, the second changed data is generated by changing the second route in the second data.

In step S230, the control unit 500 forms the second layer 820 according to the second changed data.

According to the three-dimensional shaped article manufacturing method of the present embodiment described above, the first route is changed such that the overlap degree between the first route included in the first data and the recess portions 315 is larger, the first changed data including the first changed route is generated, and the first layer 810 is formed according to the generated first changed data. Therefore, an effective anchor effect is obtained by increasing the route passing over the recess portions 315, and the adhesion between the stage 300 and the first layer 810 is improved.

In the present embodiment, in the first route changing step, the overlap degree is obtained based on the line width of the first shaping material determined based on the first deposition amount information, and the information on the diameter of each recess portion, and the first route is changed. Therefore, the overlap degree can be obtained under conditions closer to actual shaping than a case of obtaining the overlap degree based only on the route and the positions of the recess portions 315.

In the present embodiment, the deposition amount in the part where the first changed route overlap the recess portions 315 is larger than the deposition amount in the part where the first changed route does not overlap the recess portions 315. Therefore, an effective anchor effect can be obtained while preventing deformation of a recess or the like of a part formed on an upper part of the recess portions of the shaped article.

In the present embodiment, different materials are used for shaping the three-dimensional shaped article in the first step and the second step. Therefore, the first layer 810 and the second layer 820 can be shaped by selecting a material suitable for the characteristics of the shaped article to be created.

In the present embodiment, the second route is changed based on the change of the route from the first route to the first changed route in the first route changing step. Accordingly, since a deviation in the horizontal direction between the first layer 810 and the second layer 820 is prevented, a three-dimensional shaped article having a desired shape can be shaped while the anchor effect is obtained.

Here, a material of the three-dimensional shaped article used in the shaping unit 200 described above will be described. In the shaping unit 200, for example, a three-dimensional shaped article can be shaped using various materials such as a thermoplastic material, a metal material, or a ceramic material as a main material. Here, the "main material" means a material serving as a center forming the shape of the three-dimensional shaped article, and means a material that occupies a content rate of equal to or more than 50 wt % in the three-dimensional shaped article. The above-described shaping materials include those in which the main material is melted as a simple substance, or those obtained by melting a part of components contained together with the main material into a paste form.

When a thermoplastic material is used as the main material, the shaping material is generated by plasticizing the material in the melting unit 30. "Plasticizing" means applying heat to melt the thermoplastic material.

For example, the following thermoplastic resin materials can be used as the thermoplastic material.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate; and engineering plastics such as polysulfone, polyethersulfone, polyphenylene sulfide, polyarylate, polyimide, polyamideimide, polyetherimide, and polyether ether ketone Additives such as a pigment, a metal, a ceramic, a wax, a flame retardant, an antioxidant, and a heat stabilizer may be mixed into the thermoplastic material. The thermoplastic material is converted to a plasticized and melted state by the rotation of the flat screw 40 and the heating of the heater 58 in the melting unit 30. The shaping material generated by the melting of the thermoplastic material is discharged from the nozzle 61, and then cured due to a decrease in temperature.

It is desirable that the thermoplastic material is emitted from the nozzle 61 in a state in which the material is heated to a temperature equal to or higher than the glass transition point thereof and in a completely melted state. For example, when an ABS resin is used, it is desirable that the temperature of the thermoplastic material is about 200° C. when discharged from the nozzle 61.

In the shaping unit 200, for example, the following metal materials can be used as the main material instead of the above-described thermoplastic materials. In this case, it is desirable that a powder material in which the following metal material is formed into a powder form is mixed with a component to be melted when generating the shaping material, and the mixed material is supplied to the melting unit 30 as a material MR.

Examples of Metal Material

A single metal of magnesium (Mg), iron (Fe), cobalt (Co), chromium (Cr), aluminum (Al), titanium (Ti), copper (Cu), nickel (Ni), or an alloy containing one or more of these metals Examples of the Above-Described Alloy Maraging steel, stainless steel, cobalt chrome molybdenum, titanium alloy, nickel alloy, aluminum alloy, cobalt alloy, and cobalt chromium alloy In the shaping unit 200, a ceramic material can be used as the main material instead of the above-described metal materials. For example, oxide ceramics such as silicon dioxide, titanium dioxide, aluminum oxide, and zirconium oxide, or non-oxide ceramics such as aluminum nitride can be used as the ceramic material. When the metal material or ceramic material as described above is used as the main material, the shaping material discharged onto the shaping surface 311 may be cured by sintering.

The powder material of the metal material or the ceramic material to be charged into the material supply unit 20 as the material MR may be a mixed material obtained by mixing a plurality of types of powder including a single metal, powder of an alloy, and powder of a ceramic material. The powder material of the metal material or the ceramic material may be coated with, for example, a thermoplastic resin as exemplified above, or a thermoplastic resin other than the above thermoplastic resin. In this case, the thermoplastic resin may be melted in the melting unit 30 to exhibit fluidity thereof.

For example, the following solvents can be added to the powder material of the metal material or the ceramic material to be charged into the material supply unit 20 as the material MR. The solvent can be used alone or in combination of two or more selected from the following.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binders can be added to the powder material of the metal material or the ceramic material to be charged into the material supply unit 20 as the material MR.

Examples of Binder

Figure 14:
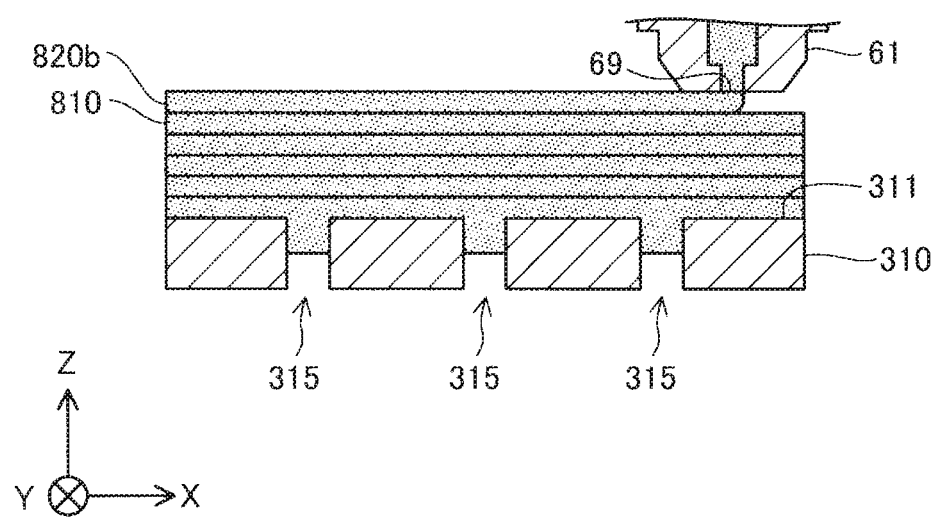
FIG. 14 is an explanatory diagram showing a state of shaping a three-dimensional shaped article according to a second embodiment.

Acrylic resin, epoxy resin, silicone resin, cellulose-based resin; other synthetic resin; polylactic acid (PLA), polyamide (PA), polyphenylene sulfide (PPS), polyether ether ketone (PEEK); or other thermoplastic resins B. Second Embodiment FIG. 14 is an explanatory diagram showing a state of shaping a three-dimensional shaped article according to the second embodiment. Since the configuration of the three-dimensional shaping device 100 according to the second embodiment is similar to that of the first embodiment, a description thereof will be omitted. In the second embodiment, the shaping processing shown in FIG. 7 is executed.

The present embodiment is different from the first embodiment in that, the same type of material is used in the first shaping step and the second shaping step. In the first embodiment, a pellet-shaped PVA resin is used as the first material, and a pellet-shaped ABS resin is used as the second material, but in the second embodiment, the same pellet-shaped ABS resin is used as the first shaping material and the second shaping material. In FIG. 14, a second layer 820b is formed of the same type of shaping material as the first layer 810. In the present embodiment, for example, the second layer 820b may be continuously formed on the first layer 810 as a base, and the first layer 810 may be cut off after completion of the shaping.

In the three-dimensional shaped article manufacturing method of the present embodiment described above, the same type of material is used as the first shaping material and the second shaping material. Therefore, the shaped article can be manufactured while improving the adhesion between the first layer 810 and the stage 300 by a simple configuration.

C. Third Embodiment

Figure 15:
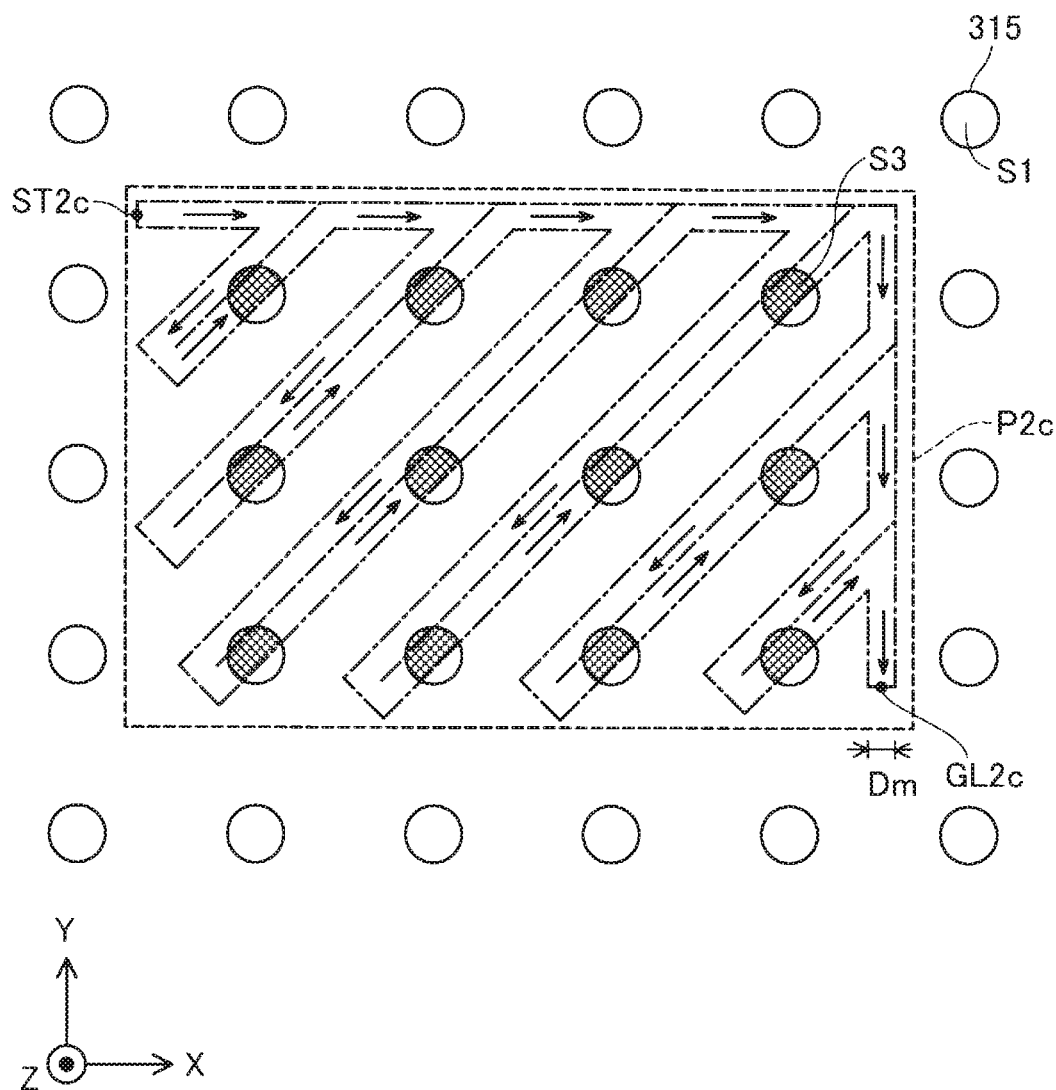
FIG. 15 is an explanatory diagram showing a trajectory of the first shaping material discharged according to the second data according to a third embodiment.

FIG. 15 shows a trajectory of the first shaping material discharged from the nozzle hole 69 according to the first changed data in the third embodiment. Since the configuration of the three-dimensional shaping device 100 according to the third embodiment is similar to that of the first embodiment, a description thereof will be omitted. In the third embodiment, the shaping processing shown in FIG. 7 is executed.

In the third embodiment, in the first route changing step of step S130 shown in FIG. 9, the first changed route having an overlap degree larger than that of the first route and less than 100% is generated. In the present embodiment, the first route changing step is executed such that the overlap degree in the first changed route is equal to or higher than a first value and equal to or less than a second value. The first value is defined, for example, as a value at which warpage of the shaping material can be prevented. In the present embodiment, the first value is 40%. The second value is defined, for example, as a value at which the user easily peels off the completed shaping material from the stage 300 by applying an external force after the shaping of the shaped article is completed. In the present embodiment, the second value is 80%.

FIG. 15 shows the trajectory of the first shaping material discharged from the nozzle hole 69 while the nozzle 61 moves from a start point ST2c to an end point GL2c. In FIG. 15, the trajectory of the first shaping material discharged from the nozzle hole 69 is indicated by broken lines and arrows. P2c surrounded by the outline is indicated by broken lines. In FIG. 15, an overlapped part having an area S3 is present in each recess portion 315 in the region P2c. Here, the area S3 is a value of 80% of the opening area S1 of the recess portion 315. Therefore, a second overlap degree in FIG. 15 is 80%. As described above, in FIG. 10, a first overlap degree is 0%. Therefore, for example, in step S130, the control unit 500 can generate the second route such that the second overlap degree is equal to or higher than the first value and equal to or less than the second value by changing the first route whose start point is ST1 and end point is GL1 to the second route whose start point is ST2c and end point is GL2c.

In the three-dimensional shaped article manufacturing method of the present embodiment described above, in the first route changing step, the first changed route having an overlap degree larger than the first route and less than 100% is generated. Therefore, the adhesion between the stage 300 and the first layer 810 can be increased to a degree that the shaped object after the completion of the shaping can be easily peeled off from the stage 300.

D. Other Embodiments (D-1) In the above embodiments, after the first layer is formed, the second data acquisition step and the second data changing step are executed. In contrast, the second data acquisition step and the second data changing step may be executed before the first layer is formed. For example, the second data acquisition step may be executed between step S110 and step S120 in FIG. 9, and the second data changing step may be executed between step S140 and step S150.

(D-2) In the above embodiments, the first data and the first changed data include the deposition amount information, and the stage data includes information on the diameter of each recess portion 315. In contrast, the first data and the first changed data may not include the deposition amount information. Further, the stage data may not include information on the diameter of each recess portion 315. In this case, for example, the overlap degree can be calculated based on the route and coordinates of the recess portions 315. Specifically, as the overlap degree, a proportion of the number of the recess portions 315 in which the route is present on the upper part relative to the number of the recess portions 315 present in the region surrounded by the outline may be calculated.

(D-3) In the above embodiments, the first data and the first changed data include the deposition amount information of the first shaping material discharged from the discharge unit 60, and in the first shaping step, when viewed from the vertical direction, the deposition amount in the route overlapping the recess portions 315 in the first changed route is larger than the deposition amount in the route not overlapping the recess portions 315 in the first changed route. In contrast, when the shaping accuracy is not influenced, the deposition amount may not be changed regardless of whether the first changed route overlaps the recess portions 315. For example, when the first layer 810 is the base part of the shaped article and the second layer 820 is not formed at a position overlapping the recess portions 315, the deposition amount may be constant in the first changed route. The deposition amount in the part where the first changed route does not overlap the recess portions 315 may be larger than the deposition amount in the part where the first changed route overlaps the recess portions 315.

(D-4) In the above embodiments, the first data changing step includes the deposition amount changing step. In contrast, the first data changing step may not include the deposition amount changing step. For example, when the deposition amount is not changed regardless of whether the first changed route overlaps the recess portions 315, the first data changing step may not include the deposition amount changing step.

(D-5) In the above embodiments, in the second data changing step, the control unit 500 generates the second changed data including the second changed route by changing the second route included in the second data. In contrast, when the shaping accuracy is not influenced, the second changed data may not be generated. For example, when the first layer 810 is the base part of the shaped article and has a sufficiently large area relative to the second layer 820, the second route may not be changed to generate the second changed data.

(D-6) In the above embodiments, by moving the start point and the end point of the route in the X direction and the Y direction in the first route changing step, the first route is changed to generate the first changed route. In contrast, for example, the first changed route may be generated by rotating the entire first route around the start point ST1 of the first route. In this case, the second route changing step shown in step S220 of FIG. 13 may be executed based on an angle obtained by rotating the first route to generate the first changed route. The first route may be changed to generate the first changed route by combining the rotation of the entire first route and the movement of the start point and the end point thereof in the X direction and the Y direction.

E. Other Aspects

The present disclosure is not limited to the embodiments described above, and may be implemented by various aspects without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. If the technical characteristics are not described as essential in the present description, they can be deleted as appropriate.

(1) According to a first aspect of the present disclosure, a three-dimensional shaped article manufacturing method is provided. The three-dimensional shaped article manufacturing method includes: a first shaping step of forming a first layer in contact with a stage provided with a recess portion by moving a discharge unit while discharging a first shaping material from the discharge unit toward the stage; and a second shaping step of stacking a second layer on the first layer by moving the discharge unit while discharging a second shaping material from the discharge unit toward the first layer, in which the first shaping step includes acquiring first data including a first route that is a route on which the discharge unit moves while discharging the first shaping material, acquiring stage data indicating a position of the recess portion in the stage, a first data changing step of generating, based on the first data and the stage data, first changed data including a first changed route obtained by changing the first route, that is, generating the first changed data based on the first data such that an overlap degree between the first changed route and the recess portion is larger than an overlap degree between the first route and the recess portion, and forming the first layer according to the first changed data. According to such an aspect, by increasing the overlap degree between the recess portion and the route, an effective anchor effect is obtained, and the adhesion between the stage and the shaped article is improved. Therefore, the warpage of the shaped article can be prevented.

(2) In the three-dimensional shaped article manufacturing method according to the above aspect, the first data may include deposition amount information representing an amount of the first shaping material discharged from the discharge unit per unit movement amount of the discharge unit in the first route, the stage data may include information on a diameter of the recess portion, and in the first data changing step, the overlap degree is obtained based on a line width of the first shaping material determined based on the deposition amount information and information on the diameter of the recess portion, and the first changed data may be generated by changing the first route. According to such an aspect, the overlap degree can be obtained under conditions closer to actual shaping than a case of obtaining the overlap degree based only on the route and the position of the recess portion.

(3) In the three-dimensional shaped article manufacturing method according to the above aspect, in the first shaping step, a deposition amount representing an amount of the first shaping material discharged from the discharge unit per unit movement amount of the discharge unit on a route in the first changed route overlapping the recess portion may be larger than a deposition amount on a route in the first changed route not overlapping the recess portion. According to such an aspect, an effective anchor effect can be obtained while preventing deformation of a part formed on an upper part of the recess portion of the shaped article.

(4) In the three-dimensional shaped article manufacturing method according to the above aspect, in the first data changing step, the first route may be changed to the first changed route such that the overlap degree between the first changed route and the recess portion is larger than the overlap degree between the first route and the recess portion and is less than 100%. According to such an aspect, the adhesion between the first layer and the stage can be increased to a degree that the shaped article after the completion of the shaping can be easily peeled off from the stage.

(5) In the three-dimensional shaped article manufacturing method according to the above aspect, the first shaping material and the second shaping material may be different types of materials. According to such an aspect, the first layer and the second layer can be shaped by selecting a material suitable for the characteristics of the shaped article to be created.

(6) In the three-dimensional shaped article manufacturing method according to the above aspect, the first shaping material and the second shaping material may be the same type of material. According to such an aspect, the shaped article can be manufactured while improving the adhesion between the first layer and the stage by a simple configuration.

(7) In the three-dimensional shaped article manufacturing method according to the above aspect, the second shaping step may include acquiring second data including a second route on which the discharge unit moves while discharging the second shaping material, and generating second changed data including a second changed route by changing the second route based on a change of the route from the first route to the first changed route in the first data changing step, and the second layer may be formed on the first layer according to the second changed data. According to such an aspect, since a deviation in the horizontal direction between the first layer and the second layer is prevented, a three-dimensional shaped article having a desired shape can be shaped while the anchor effect is obtained.

The present disclosure is not limited to the above-described three-dimensional shaped article manufacturing method, and can be implemented in various aspects. For example, the present disclosure can be implemented in forms of a data processing device for processing data for shaping a three-dimensional shaped article, a three-dimensional shaping device, a method for controlling a three-dimensional shaping device, a computer program for shaping a three-dimensional shaped article, a non-transitory tangible recording medium for storing a computer program, and the like.

What is claimed is:

1. A three-dimensional shaped article manufacturing method comprising:
    a first shaping step of forming a first layer in contact with a stage provided with a recess portion by moving a discharge unit while discharging a first shaping material from the discharge unit toward the stage; and
    a second shaping step of stacking a second layer on the first layer by moving the discharge unit while discharging a second shaping material from the discharge unit toward the first layer, wherein
    the first shaping step includes
        acquiring first data including a first route that is a route on which the discharge unit moves while discharging the first shaping material,
        acquiring stage data indicating a position of the recess portion in the stage,
        a first data changing step of generating, based on the first data and the stage data, first changed data including a first changed route obtained by changing the first route, that is, generating the first changed data based on the first data such that an overlap degree between the first changed route and the recess portion is larger than an overlap degree between the first route and the recess portion, and
        forming the first layer according to the first changed data.

2. The three-dimensional shaped article manufacturing method according to claim 1, wherein
    the first data includes deposition amount information representing an amount of the first shaping material discharged from the discharge unit per unit movement amount of the discharge unit on the first route,
    the stage data includes information on a diameter of the recess portion, and
    in the first data changing step, the overlap degree is obtained based on a line width of the first shaping material determined based on the deposition amount information and information on the diameter of the recess portion, and the first changed data is generated by changing the first route.

3. The three-dimensional shaped article manufacturing method according to claim 1, wherein
    in the first shaping step, a deposition amount representing an amount of the first shaping material discharged from the discharge unit per unit movement amount of the discharge unit on a route in the first changed route overlapping the recess portion is larger than a deposition amount on a route in the first changed route not overlapping the recess portion.

4. The three-dimensional shaped article manufacturing method according to claim 1, wherein
    in the first data changing step, the first route is changed to the first changed route such that the overlap degree between the first changed route and the recess portion is larger than the overlap degree between the first route and the recess portion and is less than 100%.

5. The three-dimensional shaped article manufacturing method according to claim 1, wherein
    the first shaping material and the second shaping material are different types of materials.

6. The three-dimensional shaped article manufacturing method according to claim 1, wherein
    the first shaping material and the second shaping material are the same type of material.

7. The three-dimensional shaped article manufacturing method according to claim 1, wherein
    the second shaping step includes
        acquiring second data including a second route on which the discharge unit moves while discharging the second shaping material, and
        generating second changed data including a second changed route by changing the second route based on a change of the route from the first route to the first changed route in the first data changing step, and
    the second layer is formed on the first layer according to the second changed data.

8. A data processing device configured to process data for shaping a three-dimensional shaped article, wherein the data processing device performs
    acquiring first data including a first route that is a route on which a discharge unit that discharges a shaping material toward a stage provided with a recess portion moves while discharging a first shaping material,
    acquiring stage data indicating a position of the recess portion on the stage, and
    generating, based on the first data and the stage data, first changed data including a first changed route obtained by changing the first route from the first data, and an overlap degree between the first changed route and the recess portion is larger than an overlap degree between the first route and the recess portion.

* * * * *